United States Patent [19]

Sari et al.

[11] Patent Number: 4,669,092
[45] Date of Patent: May 26, 1987

[54] ARRANGEMENT FOR RECEIVING DIGITAL DATA COMPRISING AN ARRANGEMENT FOR ADAPTIVE TIMING RECOVERY

[75] Inventors: Hikmet Sari, Creteil; Lydie Desperben, Joinville Le Pont, both of France

[73] Assignee: U.S. Philips Corporation, New York, N.Y.

[21] Appl. No.: 780,732

[22] Filed: Sep. 26, 1985

[30] Foreign Application Priority Data

Oct. 9, 1984 [FR] France ............................ 84 15483

[51] Int. Cl.⁴ .......................... H04B 3/04; H04L 7/08
[52] U.S. Cl. ................................ 375/14; 375/106/119
[58] Field of Search ............... 375/12, 14, 106, 111, 375/119; 331/1 A; 328/72, 74, 155; 364/718, 486; 333/18

[56] References Cited

U.S. PATENT DOCUMENTS

| | | | |
|---|---|---|---|
| 4,146,840 | 3/1979 | McRae et al. | 375/119 |
| 4,334,313 | 6/1982 | Gitlin et al. | 375/106 |
| 4,535,443 | 8/1985 | Korevaar | 375/14 |
| 4,577,329 | 3/1986 | Brie et al. | 375/14 |

OTHER PUBLICATIONS

IEEE Transactions on Communication Technology, vol. COM-19, No. 3, Jun. 1971, pp. 268-280, "Simultaneous Adaptive Estimation and Decision Algorithm for Carrier Modulated Data Transmission Systems", Hisashi Kobayashi.

*Primary Examiner*—Benedict V. Safourek
*Attorney, Agent, or Firm*—Marianne Rich; Anne E. Barschall

[57] ABSTRACT

A digital data receiving arrangement, which adapts itself to channel variations of a transmission system, comprises an adaptive receiver stage (11), having an adaptive equalizer and at least one sampler, and producing, at a certain rate, complex samples $y_k$ from the input signal x(t), a decision circuit (14) supplying detected complex samples $a_k$ and an adaptive timing recovery circuit (12) determining the optimal sampling instant by minimizing a quadratic function J which represents the difference between $y_k$ and $a_k$. The adaptive timing recovery circuit comprises a device (121) for shaping a primary clock signal in accordance with a secondary clock signal, whose period is twice the period of the primary clock and whose consecutive ascending edges are spaced in time by $T_1$ and $T_2$, said secondary clock producing alternately two sampling instants $\tau$ and $\tau + \Delta\tau$. By minimizing the function J, on the basis of the difference determined for two instants $\tau_k$ and $\tau_k + \Delta\tau$, the control of the timing recovery is defined for the consecutive sampling instants $\tau_k$ and $\tau_{k+1}$.

11 Claims, 8 Drawing Figures

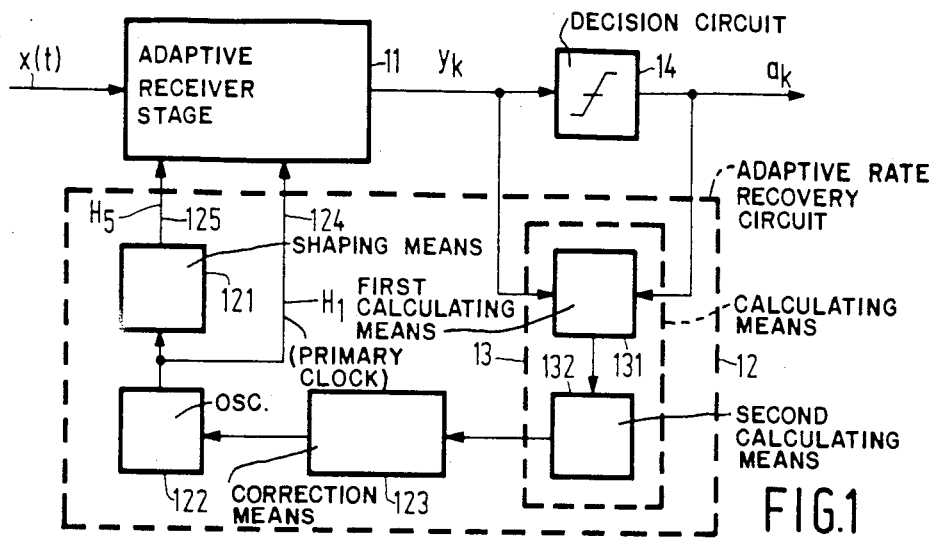
FIG.1
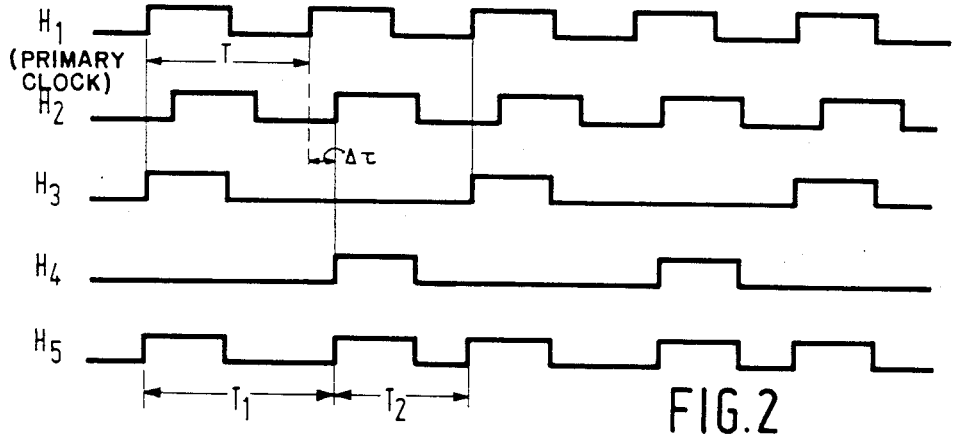
FIG.2
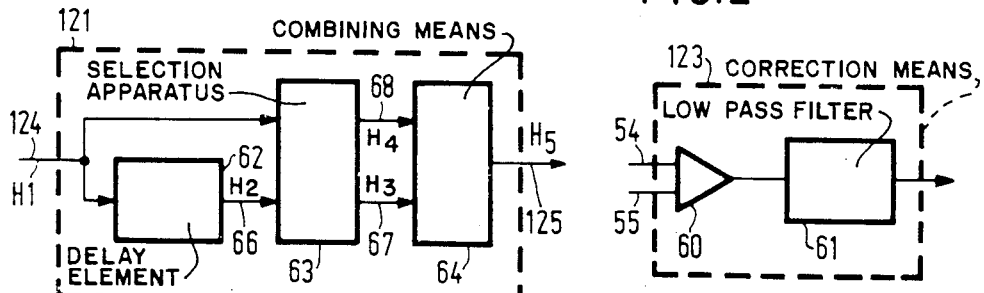
FIG.3
FIG.4

ARRANGEMENT FOR RECEIVING DIGITAL DATA COMPRISING AN ARRANGEMENT FOR ADAPTIVE TIMING RECOVERY

BACKGROUND OF THE INVENTION

The invention relates to an arrangement for receiving digital data which adapts itself to channel variations of a transmission system, comprising an adaptive receiving stage, which incorporates an adaptive equalizer and at least one sampler, the adaptive receiving stage producing, at a certain rate, complex samples $y_k$ from the input signal $x(t)$, a decision circuit supplying detected complex symbols $a_k$, and an adaptive timing recovery arrangement determining the optimum sampling instant by minimizing a quadratic function J which represents the difference between $y_k$ and $a_k$.

The performance of high-speed digital transmission systems using at the receiver end an adaptive equalizer having coefficient taps spaced apart by one symbol duration to compensate for linear distortions of the channel, depend to a very large extent on the sampling instant. A bad choice of the sampling instant may result in a zero spectrum near the edge of the spectrum band of the sampled signal, in which case equalizing the channel will be difficult.

Typically, the adaptive equalizers utilize the minimum mean square error criterion for adaptation to the channel. The sampling instant is chosen at the output of the equalizer while minimizing a quadratic function J which, also and preferably, may be the mean square error.

An adaptive equalizer structure for high-rate transmission systems is described by H. Kobayashi in "Simultaneous Adaptive Estimation and Decision Algorithm for Carrier Modulated Data Transmission Systems", IEEE Transactions on Communication Technology, Vol. COM'19, No. 3, pages 268–280, June 1971.

The author describes a receiver structure in which the timing and carrier recovery, and also the adaptation of the digital equalizer, are effected with the aid of a minimum mean square error criterion. In this structure, the signal is first demodulated, thereafter sampled and then processed by the adaptive equalizer. However, to effect the timing recovry ensuring an optimum sampling phase, in the receiver structure described by H. Kobayashi, the input signal $x(t)$ is first differentiated and thereafter processed in parallel with the main path in accordance with the same principles, using a second sampler and a second adaptive equalizer having characteristics identical to those of the main adaptive equalizer. A correlation circuit is thereafter provided at the output of the timing recovery loop to minimize the mean square error function chosen and to intervene in the phase of the sampling instant.

In a concrete situation it was found to be difficult to utilize this structure as actually it means doubling the complexity of the receiver.

SUMMARY OF THE INVENTION

The invention has for its object to effect the timing recovery without doubling the complexity of the circuit, and without effecting the calculation and the subsequent processing of the signal of the derivative of $x(t)$.

To that end, the invention whose field is defined in the opening paragraph is characterized in that the adaptive receiving arrangement comprises an adaptive timing recovery circuit comprising:

an oscillator producing a primary clock, means for shaping the primary clock in accordance with a secondary clock whose period is twice the period of the primary clock, and whose consecutive ascending edges are spaced in time by $T_1$ and $T_2$, said secondary clock producing alternately two sampling instants $\tau$ and $\tau + \Delta\tau$, where $\tau$ is the sampling instant of the primary clock and $\Delta\tau$ is a constant, means for approximately calculating the quadratic function J and the sign of its variations between the instants $\tau$ and $\tau + \Delta\tau$, and means for correcting the phase of the primary clock in accordance with the sign of the variations of the quadratic function J.

The receiving arrangements of the data transmission systems comprise a demodulator producing a baseband signal $x(t)$. After having been processed in a receiver stage by a sampler and an adaptive equalizer, this signal supplies the samples $y_k$ which generally are complex. These samples $y_k$ are thereafter applied to a decision circuit which supplies detected symbols $a_k$. But, depending on the sampling instant, the error committed in determining the detected symbols $a_k$ may be significant. To reduce this error, a function J is chosen which represents the difference between the samples $y_k$ and the symbols $a_k$. The gradient of this function J with respect to the sampling instant $\tau$ is determined, i.e. $(\partial J)/(\partial \tau)$, and this gradient is minimized by acting on the sampling instant.

A first quadratic function J is, for example, the mean square value $$J = E\{|e_k|^2\} \tag{1}$$

of the error $e_k$ such that $e_k = y_k - a_k$ where the symbol $|.|$ represents the magnitude (modulus) and the symbol $E\{.\}$ represents the mean value.

To minimize J a stochastic version of the gradient algorithm is employed. The gradient of J:

$$g_k = \frac{\partial E\{|e_k|^2\}}{\partial \tau} \tag{2}$$

is not available, but a non-biased estimator thereof is $$\hat{g}_k = \frac{|e_k(\tau_k + \Delta\tau)|^2 - |e_{k-1}(\tau_{k-1})|^2}{\Delta\tau} \tag{3}$$

where $\Delta\tau$ is a small difference, and where $\tau_k$ and $\tau_{k-1}$, with $|\tau_k - \tau_{k-1}| <> \Delta\tau$, are two consecutive sampling instants of the primary clock, the former being derived from the latter by the control described hereafter by equation (7).

From this gradient estimator the continuous function $g(t)$ is constructed, which is defined by:

$$\hat{g}(t) = Sgn(g_k) \text{ if } t \in |kT, (k+1)T| \tag{4}$$

where T is the symbol duration of the transmission and Sgn(.) designates the sign function.

Actually, the function Sgn(.) has been introduced to simplify the implementation, but does not constitute any restriction of the invention. The signal $g(t)$, after having been filtered by a lowpass filter, controls an oscillator producing the primary clock.

The output of the lowpass filter is $\epsilon(t) = f(t) \times g(t)$ where f(t) designates the impulse response of the filter and the asterisk denotes the convolution operation. When no filtering is effected the equation is reduced to: $\epsilon(t) = g(t)$.

In practice, a lowpass filter is used to provide a better compromise between the performances during the acquisition peiod and during the steady-state. This filter, referred to as a loop filter, belongs to the conventional class of filters used in phase-locked loops which are known to a person skilled in the art.

The signal $\epsilon(t)$ controls the oscillator producing the primary clock, whose phase $\phi(t)$ varies in accordance with the equation:

$$\phi(t) = -K \cdot \epsilon(t) \quad (5)$$

where K is the gain constant of the oscillator.

The phase variation during the $k^{th}$ symbol period of the primary clock produced by this oscillator becomes:

$$\phi_k = -K \int_{kT}^{(k+1)T} \epsilon(t) \cdot dt \quad (6)$$

In practice, this variation will be slight relative to $\Delta\tau$.

Thus, the two consecutive instants $\tau_{k+1}$ and $\tau_k$ are linked by the equation:

$$\tau_{k+1} = \tau_k - K \int_{kT}^{(k+1)T} \epsilon(t) \cdot dt \quad (7)$$

A second quadratic function J is, for example $$J = E\{f_k^2\} \quad (8)$$

where $f_k = |y_k|^2 - |a_k|^2$ with the same notations as in the foregoing.

The equation:

$$\hat{g}_k = \frac{f_k^2(\tau_k + \Delta\tau) - f_{k-1}^2(\tau_{k-1})}{\Delta\tau} \quad (9)$$

is obtained using a derivation similar to that used for equation (3).

Equation (7) linking the consecutive instants $\tau_{k+1}$ and $\tau_k$ can be used by substituting equation (9) for the term $\hat{g}_k$ in equation (4).

According to the invention, the sampling operation is effected at two consecutive sampling instants, which has for its purpose to have a substantially constant difference, $\tau_k + \Delta\tau - \tau_{k-1} \simeq \Delta\tau$, appear in the successive sampling operations. Thus, at the instants $\tau_{k-1}$ and $\tau_k + \Delta\tau$, the consecutive errors $e_{k-1}$ and $e_k^\Delta$ appear in accordance with the first quadratic function appear, or $f_{k-1}$ and $f_k^\Delta$ in accordance with the second quadratic function, which makes it possible to determine the consecutive sampling instants using the equation (7) and equations (3) or (9), respectively. This is effected whilst correcting the phase of the primary clock by a signal which depends on the sign of the expressions in equations (3) or (9). The primary clock thus corrected is thereafter given the correct shape to produce the secondary clock which controls the operation of the sampler.

In a first embodiment the adaptive receiver arrangement includes, inter alia, means for producing the secondary clock controlling a sampler which is followed by a digital adaptive equalizer.

In accordance with a second embodiment, the adaptive receiver arrangement includes, inter alia, means for producing the secondary clock controlling a sampler which is preceded by an analog adaptive e equalizer.

In a third embodiment, the adaptive receiver arrangement includes, inter alia, means for producing the secondary clock, which in this case is split into two time-shifted clock signals, controlling two samplers which are preceded by an analog adaptive equalizer.

BRIEF DESCRIPTION OF THE DRAWINGS

The invention will be more fully appreciated from the following description given by way of example with reference to the accompanying drawings in which:

FIG. 1 shows a block diagram of an adaptive receiver arrangement according to the invention;

FIG. 2 shows a diagram of clock signal sequences;

FIG. 3 shows a block diagram for generating the secondary clock;

FIG. 4 shows a block diagram of an embodiment of the means for correcting the phase of the primary clock;

DETAILED DESCRIPTION OF THE PREFERRED EMBODIMENTS

Figure 6:
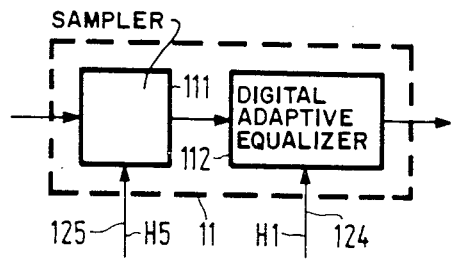
FIG. 6 shows a block diagram of an embodiment of the adaptive receiver stage for a digital adaptive equalizer.

FIG. 1 shows an adaptive receiver apparatus according to a preferred embodiment of the invention in the case digital processing is effected. The baseband signal x(t), which may be a complex signal, enters an adaptive receiver stage 11 which is followed by a decision circuit 14. An adaptive timing recovery circuit 12 determines, from the samples $y_k$ and the detected symbols $a_k$, the operating timing of the adaptive receiver stage 11. In this preferred embodiment the adaptive receiver stage 11 includes, as shown in FIG. 6, a sampler 111, which then is an analog-to-digital converter, followed by a digital adaptive equalizer 112. The adaptive receiver stage 11 (FIG. 1) produces samples $y_k$ which may be complex. Using these samples as inputs, the decision circuit 14 provides the detected symbols $a_k$. The decision operation results in the appearance of errors between the sequences of samples $y_k$ and the sequences of detected symbols $a_k$. Then the difference between the sequences $y_k$ and the sequences $a_k$ is determined and a quadratic function J of this difference is calculated, the sign of its successive variations being determined thereafter. Calculating means 13 receive the sequences $y_k$ and $a_k$ and determine the function J in a first calculating means 131 and thereafter the sign of the variations of the function J in the second calculating means 132. Depending on the sign of these variations, correction means 123 produce a correction signal which acts on an oscillator 122. The latter applies a primary clock signal H1, via a connection 124, to the adaptive receiver stage 11 and also to shaping means 121 which produce the secondary clock.

FIG. 2 shows the clock signal sequence, illustrating an example of the mechanism for forming the secondary clock from the primary clock. FIG. 3 shows in a block diagram an example of the means which produce the clock signals. The primary clock (connection 124, clock H1) is delayed in a delay element 62 for producing a clock H2 at its output 66. A selection arrangement 63 alternately cancels one period out of two periods of each of the clocks to produce the clock signals H3 and H4 at its respective outputs 67 and 68. These clock signals are then combined to form the secondary clock (clock H5, connection 125) whose period is twice the period of the primary clock and whose consecutive ascending edges are spaced apart in the time by $T_1$ and $T_2$, said secondary clock producing two sampling instants $\tau$ and $\tau+\Delta\tau$. This is the same as saying that, with respect to the regular period T of the primary clock (clock H1), the period $T_1$ exceeds it by a value $\Delta\tau$, and that the period $T_2$ is shorter by the same value.

For the case in which the quadratic function J is defined by the relations (1) or (8), the calculating means 13 includes a static memory storing the values, calculated beforehand, of the sign of the variations of the square function J for all the parts of foreseeable complex values $y_k$ and $a_k$, the memory being read by addressing it with the determined complex values of $y_k$ and $a_k$.

Figure 5:
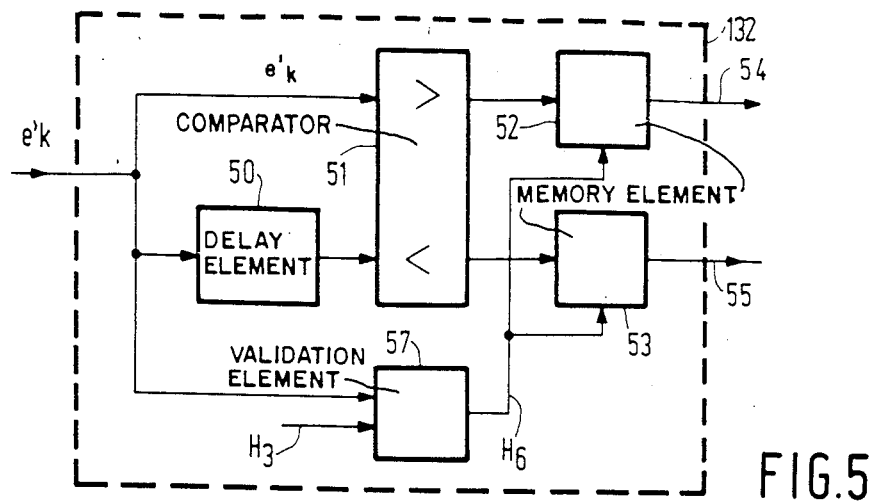
FIG. 5 shows a block diagram of an embodiment of the means for determining the sign of the variations of the quadratic function J, when only the real part $e'_k$ of $e_k$ is taken into account and when the real parts are positive during two consecutive instants.

However, for the case in which the function J is defined by the relation (1), it is equally possible for the first calculating means 131 to include a subtracter effecting the calculations $e_k=y_k-a_k$ and a squaring circuit, for example a multiplier. It is also possible to take only the real part of $e_k$, which part is denoted by $e'_k$, for the function J when that part is positive. In this second case, the sign of the variations of the function J is determined in the second calculating means 132. This is, for example, the calculating means shown in FIG. 5. To this end the information originating from the first calculating means 131 enters a delay element 50 and is applied to an input of a comparator 51. The other input of the comparator 51 receives, directly, the output of the first calculating means 131. Thus there arrive simultaneously at the inputs of the comparator 51 the delayed information $e'_{k-1}$ and the subsequent non-delayed information $e'_k$. The comparator has two outputs which respectively pass to the active state when $e'_{k-1}<e'_k$ or $e'_{k-1}>e_k$. The active or non-active states of these outputs are stored in two memory elements 52, 53 which are enabled by a clock signal H6 obtained by only validating the ascending edges of the clock H3 when the respective signs of $e'_k$ and $e'_{k-1}$ are both positive. This is effected in a validation element 57. The outputs 54 and 55 of these memory elements act on the primary clock correction means 123. This correction means, as shown in FIG. 4 includes, for instance, an operational amplifier 60 followed by a lowpass filter 61. The operational amplifier 60 is, for example, the type LF 356 produced by SIGNETICS. The characteristics of the lowpass filter 61 are chosen so as to define the pull-in range and to limit the phase noise of the oscillator. The correction acts on the oscillator 122 which is, for example, the oscillator type MC 1648 from MOTOROLA, which supplies from its output 124 the primary clock H1 with a frequency of, for example, 35 MHz.

Figure 7:
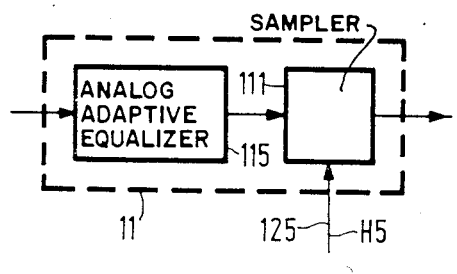
FIG. 7 shows a block diagram of an embodiment of an adaptive receiver stage for an analog adaptive equalizer.

In a second embodiment the adaptive receiver stage 11 includes, as shown in FIG. 7, an analog adaptive equalizer 115 followed by a sampler 111.

Figure 8:
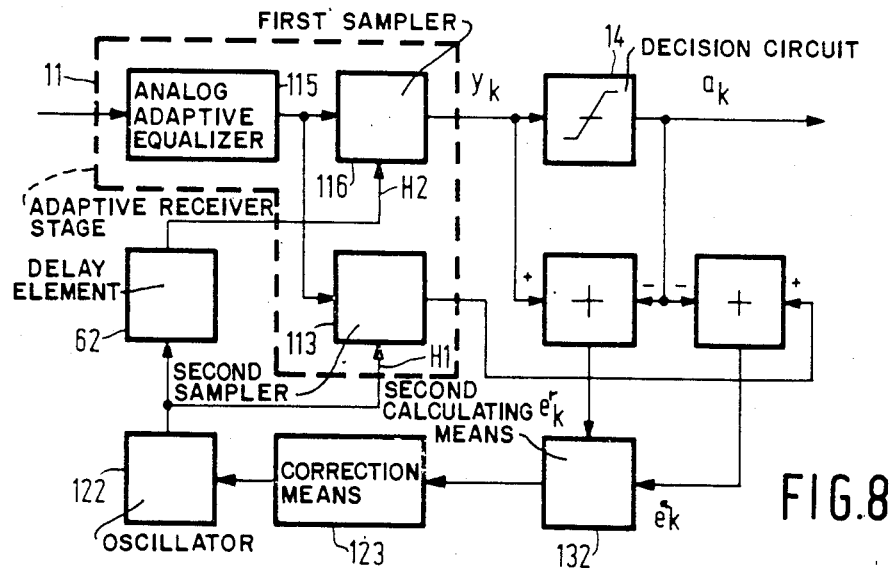
FIG. 8 shows a block diagram of the adaptive receiver arrangement for an analog adaptive equalizer for the case that the secondary block is split into two time-shifted clock signals.
Figure 9:
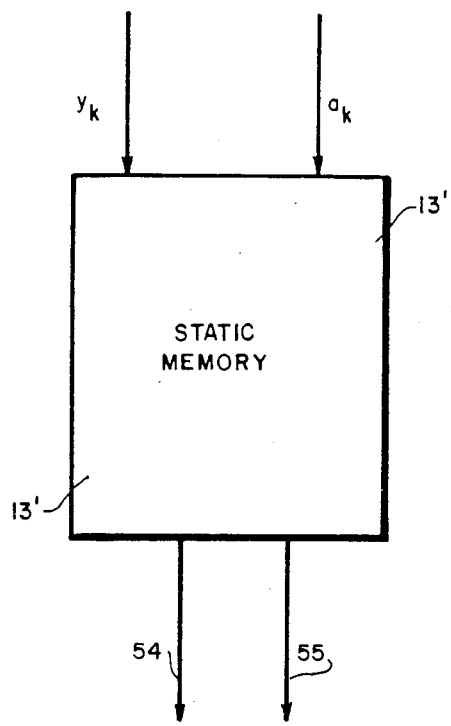
FIG. 9 shows a block diagram of a static memory to be used as a calculating means.

In a third embodiment such as it is shown in FIG. 8, the adaptive receiver stage 11 includes an analog adaptive equalizer 115 followed in one channel by a first sampler 116 and in another channel by a second sampler 113. All the elements identical to those shown in FIG. 3 are given the same reference numerals. The means 121 for shaping the primary clock is reduced in this case to the delay element 62 of FIG. 3. The sampling clock signals are then the clock signals H1 and H2 shown in FIG. 2, which appear on the connections 124 and 66 of FIG. 3. These sampling clock signals each control the respective samplers 113 and 116. All the other operational principles are similar to those described for the first embodiment. The error $e^a_k$ ($e^r_k$, respectively) is the difference between the sample at the output of the sampler 113 (or 16, respectively) and the symbol determined at the instant k.

What is claimed is:

1. An apparatus, for receiving digital data, which adapts itself to the channel variations of a transmission system comprising:

(a) an adaptive receiving stage having an input means for receiving a signal x(t) and a clock signal, an output means for providing complex samples $y_k$ at a certain timing, the stage including:
 (i) an adaptive equalizer; and
 (ii) at least one sampler coupled to the adaptive equalizer;

(b) a decision circuit having an input for receiving the complex samples $y_k$, said decision circuit providing detected complex symbols $a_k$;

(c) an adaptive timing recovery circuit for determining an optimum sampling instant by minimizing a quadratic function J which represents a difference between the complex samples $y_k$ and the detected complex symbols $a_k$, the adaptive timing recovery circuit including:
 (i) input means for receiving the complex samples $y_k$ and the detected complex symbols $a_k$;
 (ii) an oscillator for producing a primary clock having a sequence of pulses with first and second edges;
 (iii) means for shaping said primary clock to produce a secondary clock whose period is twice the period of said primary clock, said secondary clock having two pulses in each of its periods, each pulse having a first edge corresponding to a first transition from a first state to a second state and a second edge corresponding to a second transition from the second state to the first state, consecutive first edges of said secondary clock alternately coinciding with and following by a constant delay $\Delta\tau$ consecutive first edges of said primary clock, first edges of said secondary clock representing sampling instants;
 (iv) means, having an input for receiving the complex samples $y_k$ and the detected complex symbols $a_k$, for approximately calculating a quadratic function J and a sign of approximations of variations of the quadratic function J, between a first first edge of said secondary clock which coincides with a first first edge of said primary clock and a second first edge of said secondary clock which follows a second first edge of said primary clock;

(v) means responsive to said calculating means for correcting the phase of the primary clock in accordance with the sign of the variations of the quadratic function J; and (vi) output means coupled to the adaptive receiving stage for providing thereto said clock representing the sampling instants.

2. The apparatus of claim 1 wherein the means for calculating comprises a static memory in which previously calculated values of the sign of the variations of the quadratic junction J are stored for all foreseeable pairs of complex samples $y_k$ and detected complex symbols $a_k$, the memory being addressed by the complex samples $y_k$ and the complex symbols $a_k$.

3. The apparatus of claim 1 wherein the quadratic function J is the mean square value $E\{|e_k|^2\}$ of an error $e_k = y_k - a_k$, and wherein the variations of J are determined from the real part $e'_k$ of $e_k$, when the real part $e'_k$ of $e_k$ is positive at two consecutive first edges of said secondary clock, and wherein the means for calculating the quadratic function J and the sign of its variations comprises:

(a) a subtractor receiving at its inputs the complex samples $y_k$ and the detected symbols $a_k$ and producing at its output the error $e_k = y_k - a_k$, (b) a delay element for delaying the real part $e'_k$ of the error $e_k$ y one period of the primary clock, (c) a validation element which eliminates one period out of two from the primary clock when the real part $e'_{k-1}$ of a delayed error $e_{k-1}$ and the real part $e'_k$ of the error $e_k$ are both positive, (d) a comparator receiving simultaneously the delayed real part $e'_{k-1}$ of the delayed error $e_{k-1}$ from the delay element and the real part $e'_k$ of the error $e_k$ from the subtractor for comparing $e'_{k-1}$ and $e'_k$, and (e) memory means for storing the result of comparing $e'_{k-1}$ and $e'_k$ under the control of the validation element.

4. The apparatus of claim 1 wherein the adaptive receiving stage comprises a sampler comprising an analog-to-digital converter controlled by the secondary clock, which sampler is followed by a digital adaptive equalizer.

5. The apparatus of claim 1 wherein the adaptive receiving stage comprises an analog adaptive equalizer having an output coupled to a sampler which is under the control of the secondary clock.

6. The apparatus of claim 1 comprising means for splitting the secondary clock into two time-shifted clocks, and wherein the adaptive receiving stage comprises an analog adaptive equalizer having an output coupled to two samplers, the samplers being controlled by respective ones of the two time-shifted clocks.

7. The apparatus of claim 1 wherein said shaping means comprises:

(A) a delay element coupled to receive said primary clock and having an output at which a delayed clock is provided;

(B) a selection circuit for alternately cancelling one period out of two from a clock, said selection circuit having a first input for receiving the delayed clock from the delay element and a second input for receiving the primary clock, said selection circuit providing a first output at which an altered version of the delayed clock is provided and a second output at which an altered version of the primary clock is provided; and (C) means for combining the outputs of the selection circuit to produce said secondary clock.

8. The apparatus of claim 1 wherein the correction means comprises:

(A) an operational amplifier coupled to the output of the calculating means; and (B) a low pass filter chosen so as to define a pull in range and to limit phase noise of the oscillator, said low pass filter having an input coupled to the output of the operational amplifier and an output coupled to the oscillator.

9. The apparatus of claim 1 wherein the calculating means comprises means for approximating J according to the formula $E\{|e_k|^2\}$ where $e_k$ is an error signal equal to $y_k - a_k$.

10. The apparatus of claim 1 wherein the calculating means comprises means for approximating J according to the formula $E\{f_k^2\}$ where $f_k$ is an error signal equal to $|y_k|^2 - |a_k|^2$.

11. An apparatus for receiving digital data which adapts itself to channel variations of a transmission system comprising:

(A) an adaptive receiving stage including:

(i) an adaptive equalizer having an input for receiving a transmitted signal;

(ii) a first sampler having: a first input coupled to an output of the analog adaptive equalizer, a clock input for receiving a first clock signal, and an output at which first complex samples are provided;

(iii) a second sampler having: a first input coupled to the output of the analog adaptive equalizer, a clock input for receiving a second clock, and an output at which second complex samples are provided;

(B) a decision circuit having an input for receiving said first complex samples, said decision circuit providing detected comlex symbols;

(C) an adaptive timing recovery circuit for determining an optimum sampling instant including:

(i) a first subtractor having: a first input coupled to receive said first complex samples, a second input coupled to receive said detected complex symbols, and an output at which first error signals $e^r_k$ are provided;

(ii) a second subtractor having: a first input coupled to receive the detected complex symbols, a second input coupled to receive said second complex samples, and an output at which second error signals $e^a_k$ are provided;

(iii) means for calculating a sign of variations of an approximation of a quadratic function representing the difference between the complex samples and the detected complex symbols, said means for calculating having a first input coupled to receive said first error signals $e^r_k$, a second input coupled to receive said second error signals $e^a_k$, and an output at which the sign of the variations is provided;

(iv) an oscillator for producing a primary clock, said primary clock being provided to said clock input of said second sampler;

(v) a delay element coupled to receive and delay the primary clock from said oscillator, said delay element having an output coupled to the clock input of said first sampler; and (iv) means responsive to said calculating means for correcting the phase of the primary clock.

* * * * *